United States Patent
Pande et al.

(10) Patent No.: US 10,530,795 B2
(45) Date of Patent: Jan. 7, 2020

(54) WORD EMBEDDINGS FOR ANOMALY CLASSIFICATION FROM EVENT LOGS

(71) Applicant: Target Brands, Inc., Minneapolis, MN (US)

(72) Inventors: Amit Pande, Ames, IA (US); Vishal Ahuja, Karnataka (IN)

(73) Assignee: Target Brands, Inc., Minneapolis, MN (US)

( * ) Notice: Subject to any disclaimer, the term of this patent is extended or adjusted under 35 U.S.C. 154(b) by 223 days.

(21) Appl. No.: 15/650,399

(22) Filed: Jul. 14, 2017

(65) Prior Publication Data
US 2018/0270261 A1 Sep. 20, 2018

Related U.S. Application Data

(60) Provisional application No. 62/473,127, filed on Mar. 17, 2017.

(51) Int. Cl.
*H04L 29/06* (2006.01)
*G06N 20/00* (2019.01)

(52) U.S. Cl.
CPC ......... *H04L 63/1425* (2013.01); *G06N 20/00* (2019.01)

(58) Field of Classification Search
CPC ............................ H04L 63/1425; G06N 20/00
USPC ....................................................... 726/23
See application file for complete search history.

(56) References Cited

U.S. PATENT DOCUMENTS

| | | |
|---|---|---|
| 8,209,567 B2 | 6/2012 | Cohen et al. |
| 8,544,087 B1 | 9/2013 | Eskin et al. |
| 9,306,966 B2 | 4/2016 | Eskin et al. |
| 2015/0058982 A1 | 2/2015 | Eskin et al. |
| 2015/0135320 A1* | 5/2015 | Coskun ............... H04L 63/1425 726/24 |
| 2016/0191561 A1 | 6/2016 | Eskin et al. |
| 2016/0307566 A1 | 10/2016 | Bellegarda |
| 2017/0034187 A1 | 2/2017 | Honig et al. |
| 2018/0046475 A1* | 2/2018 | Wei ..................... G06F 9/44552 |
| 2018/0159871 A1* | 6/2018 | Komashinskiy .... H04L 63/1416 |
| 2018/0197089 A1* | 7/2018 | Krasser .................... G06N 5/04 |

OTHER PUBLICATIONS https://gab41.lab41.org/three-things-we-learned-about-applying-word-vectors-to-computer-logs-c199070f390b#qsulufi0u (Web Page Printed Oct. 30, 2017).

* cited by examiner

*Primary Examiner* — Michael S McNally
(74) *Attorney, Agent, or Firm* — Merchant & Gould P.C.

(57) ABSTRACT

Aspects of the present disclosure describe systems and methods for rapidly detecting threats or other security breaches in enterprise networks. In particular, all enterprise network communications may be monitored to detect anomalous events. In one example, each event log in a collection of event logs may be evaluated, wherein an event log having one or more features is monitored and identified as being anomalous based on identifying one or more anomalous features therein. Anomalous features are identified as being anomalous based on the existence of one or more features in the event log that deviate from characteristic contextual features. Rules or models may thereafter applied to each event log containing the anomalous feature.

14 Claims, 12 Drawing Sheets

WORD EMBEDDINGS FOR ANOMALY CLASSIFICATION FROM EVENT LOGS

CROSS-REFERENCE TO RELATED APPLICATIONS

This application claims priority to U.S. Provisional Application Ser. No. 62/437,127, filed Mar. 17, 2017 and entitled "Word Embeddings For Anomaly Classification From Event Logs," the disclosure of which is incorporated herein by reference in its entirety.

BACKGROUND

Intrusion detection, fault detection, and fraud detection are among many types of threat monitoring schemes enterprises conduct regularly, and oftentimes daily. However, the amount of data an enterprise processes daily, or even hourly, is massive. Accordingly, normal methods of anomaly detection, which require applying one or more rules to each event representative of a possible intrusion in an enterprise network can be slow and inefficient, rendering threat detection less effective. The more quickly a threat is detected, the more quickly intrusions can be caught and corrected. Thus, slow detection of threats in a system in which speed is vitally important may result in the spread of more threats. It is with respect to these and other general considerations that embodiments have been described.

SUMMARY

In a first aspect, a method for training and applying a model to detect and classify anomalies in event logs is disclosed. The method comprises: building a vocabulary of one or more unique features across a collection of event logs; for each event log of the plurality of event logs included in the collection: generating a matrix of feature-context pairs for each unique feature; and generating a unique vector representation of each feature for each feature-context pair; training the model using the vector representation of each feature to identify a contextual likelihood of each possible feature-context pair; applying the trained model to a second collection of event logs to generate a classification score for each feature within each event log of the second collection, the classification score representing a contextual likelihood of the feature appearing within the context included in that event log; and based on the classification score of a feature within a particular event log being outside a predetermined threshold: identifying the particular event log having the feature as containing an anomaly; and classifying the feature as being anomalous.

In a second aspect, a system for training and applying a model to detect and classify anomalies in event logs is disclosed. The system comprises: a computing device including a processor, a memory communicatively coupled to the processor, and a content output device, the memory storing instructions executable by the processor to: build a vocabulary of one or more unique features across a collection of event logs; for each event log of a plurality of event logs included in the collection of event logs: generate a matrix of feature-context pairs for each unique feature; and generate a unique vector representation of each feature for each feature-context pair; train the model using the vector representation of each feature to identify a contextual likelihood of each possible feature-context pair; apply the trained model to a second collection of event logs to generate a classification score for each feature within each event log of the second collection, the classification score representing a contextual likelihood of the feature appearing within the context included in that event log; based on the classification score of a feature within a particular event log being outside a predetermined threshold: identify the particular event log having the feature as containing an anomaly; and classify the feature as being anomalous; verify each identified event log having the feature as containing an anomaly; and based on an identification of a threat from application of the one or more rules, generate an alert.

In a third aspect, a method for training and applying a model to detect and classify anomalies in event logs is disclosed. The method comprises: building a vocabulary of one or more unique features across a collection of event logs; for each event log of a plurality of event logs included in the collection of event logs: generating a matrix of feature-context pairs for each unique feature; and generating a unique vector representation of each feature for each feature-context pair; training the model using the vector representation of each feature to identify a contextual likelihood of each possible feature-context pair; applying the trained model to a second collection of event logs to generate a classification score for each feature within each event log of the second collection, the classification score representing a contextual likelihood of the feature appearing within the context included in that event log; and based on the classification score of a feature within a particular event log being outside a predetermined threshold: verifying each identified event log having the feature as containing an anomaly; and classifying the feature as being anomalous; applying one or more rules to each identified event log as containing an anomaly; and based on identifying a threat from applying the one or more rules, generating an alert.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following figures.

DETAILED DESCRIPTION

Figure 1A:
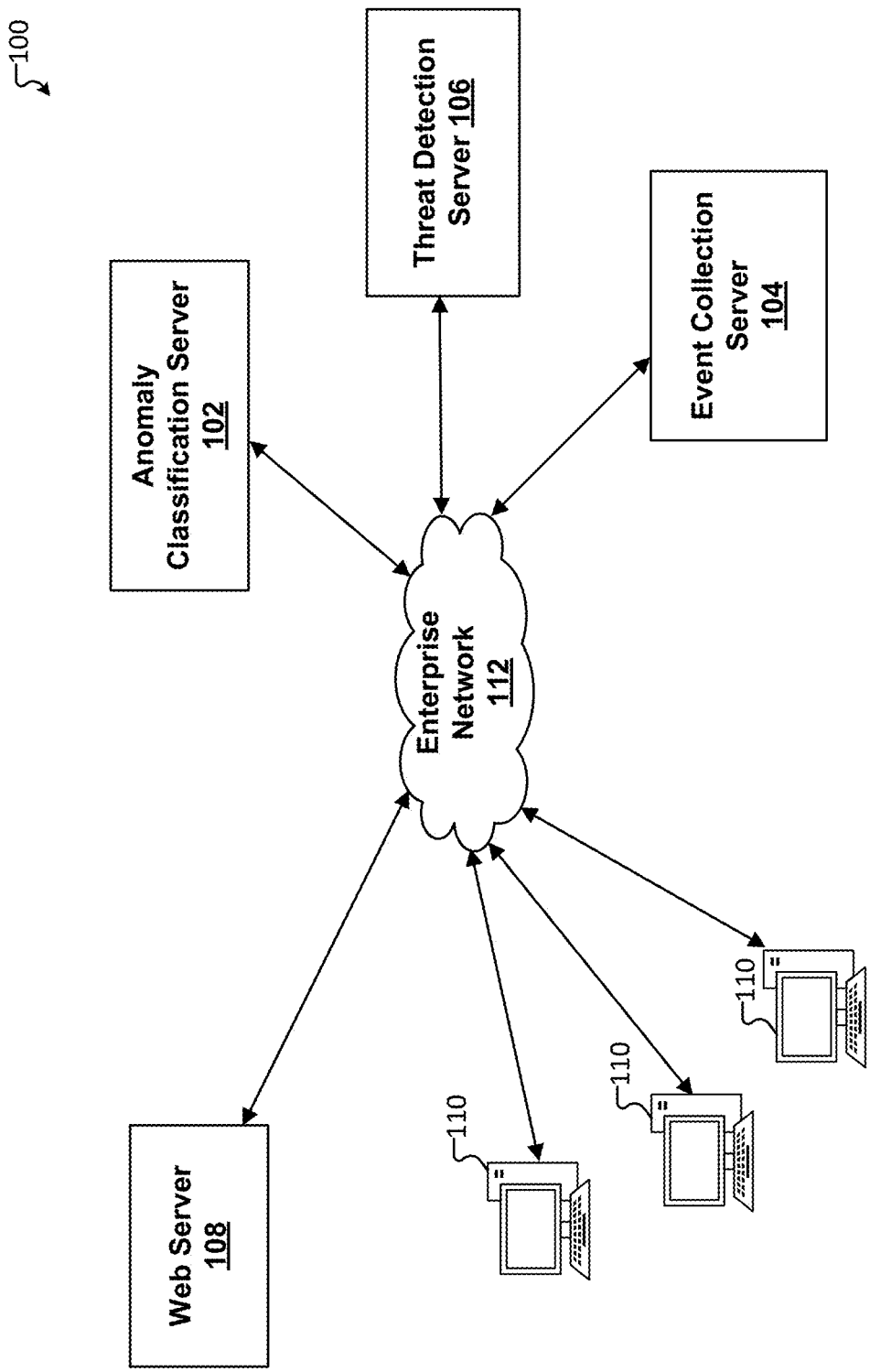
FIG. 1A illustrates one example of a system for detecting anomalies in an enterprise network.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

As described herein, typical methods of anomaly detection involve applying one or more rules to all enterprise communications. Because an enterprise may have millions of events occur within the enterprise network each day, individually applying rules to all such events (e.g., communications, or the like) results in a slow and inefficient threat detection process-rendering threat detection less than desirable. Aspects described herein therefore describe a rapid approach to detect threats or other security breaches in enterprise networks, to detect fault in critical safety systems, or even in baselining traffic in an enterprise. In one embodiment, all enterprise network communications are monitored to detect anomalous events. In particular, and as will be described in further detail herein, aspects of the present disclosure apply the concept of word embeddings to enterprise event logs. Word embeddings have historically only been used in the context of natural language processing, and in particular to identify similarities and the proper context among words. Aspects disclosed herein, however, extend the concept of word embeddings to the context of enterprise event logs to detect threats present therein. Here, improper context is indicative of an anomaly. Accordingly, by applying word embeddings to millions of events in an event log, an enterprise threat detection system may rapidly identify potentially anomalous events.

In one example, each event log in a collection of event logs (the collection comprising one or more event logs) may be evaluated. In an example, an event log having one or more features is monitored and identified as being anomalous based on identifying one or more anomalous features therein. As will be described in further detail herein, anomalous features are identified as being anomalous based on the existence of one or more features in the event log that deviate from characteristic contextual features. Rules are thereafter applied to each event log containing the anomalous feature to determine, for example, if the anomalous feature in fact implicates a threat or potential threat to an enterprise. Accordingly, because only anomalous logs need to be assessed, only a smaller subset of all enterprise network communications are processed against the rules to detect threats. Such a threat detection process is more rapid and therefore more valuable to an enterprise.

As described herein, a collection of event logs, the collection comprising one or more event logs, of network communications are monitored for anomalous features. A collection of event logs may represent, for example, a record of one or more events or transactions that occur in a network. In some embodiments, collections of collections of event logs, each collection from a different source, is monitored. Each event log in a collection may have associated therewith one or more features. A feature may refer to, for example, a property pertaining to a particular event. In one example, a network event log may have features such as "source IP address" and "destination IP address." Anomalous features may be identified based on an understanding of contextual features that typically occur in particular event logs. Accordingly, aspects provided herein further describe training a model to identify regularly co-occurring features in order to identify anomalous features that are not regularly occurring in an event log.

Known language models such as Word2Vec are used to represent words as vectors. In particular, a word in a sentence is assigned a vector in an N-dimensional vector space, while other words in the sentence are considered contextual, and are also each assigned a vector. The vector values assigned to contextual words are close in proximity within the N-dimensional vector space. Accordingly, the similarity in the text domain (defined by context) is preserved as similarity in the vector space. Training is performed iteratively and individually on each word within the sentence. Thus, in each iterative step, the vectors corresponding to a word are either pulled closer or pushed away from other words with which it does not appear. Such training leads to co-occurring words having vectors that are similar or in close proximity, while non-co-occurring words having vectors that are dissimilar or not in close proximity. Accordingly, Word2Vec can produce a vector representation of words in a sentence.

Aspects provided herein describe training a model to apply language models such as Word2Vec to represent features within event logs as vectors (e.g., produce word embeddings—or a vector representation of features in an event log). In particular, each feature within an event log is considered individually, and much like a word, it is represented as a vector using, for example, Word2Vec. The other features of the event log are considered contextual. The model is iteratively trained so that the vectors corresponding to a feature are either pulled closer or pushed away from other features with which it does not appear. In other words, the model iteratively learns which feature values are analogous to a specific context and which features co-occur. As will be described in further detail herein, in some examples, this approach can apply one of two Word2Vec type language models to train the disclosed model: Skip-Gram (SG) and Continuous Bag of Words (CBOW).

The trained model is used to score event logs and classify anomalies. In particular, each feature in an event log is compared to each contextual feature to generate a probability score that such feature and contextual feature is proper or improper. If a feature fits within the context of the event log, the probability score of that feature will be closer to 1. If, alternatively, the feature does not fit within the context, the probability score of that feature will be closer to 0, thereby indicating it is an anomalous feature. In some embodiments, logit scores may be used to predict instead of probabilities. Thus, the trained model may be used to detect anomalies within an event log by finding unusual or out of context features.

Accordingly, the disclosed approach describes identifying anomalous features by applying a trained model to evaluate each feature with its surrounding contextual features in the event log. Anomalous activity may be defined as items, events, or observations that do not conform to an expected pattern or other items in a dataset or, in an example, an event log. Thus, if the feature under evaluation does not fit into its context of other features of the same event log, it is flagged as being anomalous. In some embodiments, the disclosed approach generates a number of anomalies, which may or may not be classified as an actual anomaly. As such, enterprise rules are applied on anomalies identified using the trained model to confirm whether such anomalies are in fact an irregular occurrence. Thus, the provided approach is highly suitable for flagging anomalous features in large datasets so as to avoid applying rules to all data, thereby enhancing computational efficiency. Such computational efficiencies are important not only for cost-saving reasons, but also to limit latency, which is critical to reduce the containment time of threats.

In one example, an unusual network activity such as a store transaction server logging into an email website would be automatically logged as being anomalous because of the wrong feature associations for entries in the corresponding event log. In one example, the trained language model is captures statistical characteristics of features as they occur in a particular event log. In this example, the trained model is used to score each feature within the event log of the store transaction server to identify the one or more anomalous features. In other words, the trained model compares each feature of an event log of the store transaction server to the other contextual features, to determine if each feature is normal or anomalous to its context. In so doing, a probability score is assigned to each feature, as being non-reoccurring or reoccurring. A threshold probability score may be used to flag anomalous features. In one example embodiment, only those features having a probability score of less than 0.0001 are flagged as being anomalous, while in other embodiments, other thresholds may be used. Such probability thresholds may depend on the level of sensitivity that the enterprise wishes to implement. In other words, the lower the probability threshold, the fewer anomalous features may be flagged, whereas the higher the probability threshold, more anomalous features may be flagged. Each event log having one or more flagged anomalous features based on the probability threshold is thereafter processed against rules to determine whether the event is in fact a threat. Accordingly, anomalies may be quickly detected using a trained model as described herein. Determining whether such anomalies actually relate to an enterprise threat depends on the one or more rules that may be applied to such event logs.

FIG. 1A illustrates one example of a system 100 for detecting anomalies in an enterprise network.

The example system 100 includes an anomaly classification server 102, an event collection server 104, a rules server 106, a web server 108, one or more computing devices 110, and an enterprise network 112.

In one example, and as will be described in further detail herein, the anomaly classification server 102 trains a model to identify one or more anomalous features in one or more event logs using language models such as Word2Vec to represent features within event logs as vectors. The anomaly classification server may also be used to apply the trained model to detect one or more anomalous features in event logs by comparing each feature of an event log to the other contextual features within the event log to determine if each feature is normal or anomalous to its context.

In one example, the event collection server 104 collects one or more events occurring in the system 100. The event collection server 104 may capture events and transactions occurring in the web server 106. For example, the event collection server 104 may capture and store events associated with one or more computing devices 108 accessing the web server 106, outbound network traffic using of one or more enterprise servers accessing the web server 106, one or more enterprise point of sale devices accessing the web server 106 to complete transactions, etc.

In some aspects, the threat detection server 106 applies one or more enterprise rules or models to each event log containing one or more anomalous features to determine if the anomalous feature is a threat to the enterprise. As described herein, an anomalous feature of an event log is identified based on the existence of one or more features in the event log that deviate from characteristic contextual features. In one example, the anomaly classification server 102 applies a trained model to each feature of an event log to score event logs and classify anomalies. Rules, models, or a combination thereof is thereafter applied to each event log containing an anomalous feature. Accordingly, only a smaller subset of all enterprise network communications are processed against the rules or models to detect threats. The threat detection server 106 may therefore store one or more enterprise rules applied to anomalous features to specifically identify enterprise threats.

In example aspects, the computing devices 110 can be devices operated by end users or servers either included within the enterprise network 112 or communicatively connected thereto. The computing devices 110 can be any of a variety of mobile, server, or other types of computing devices, one example of which is described below in connection with FIG. 2.

In some aspects, enterprise network 112 is a computer network such as an enterprise intranet. The example enterprise network 112 may include a Local Area Network (LAN), a Wide Area Network (WAN), the Internet, wireless and wired transmission mediums. The anomaly classification server 102 may communicate with components of the system 100 via the enterprise network 110 (e.g., an enterprise intranet). Alternatively or additionally, anomaly classification server 102 may communicate with components of the system 100 via a wide area network (e.g., the Internet). In addition, the aspects and functionalities described herein may operate over distributed systems (e.g., cloud computing systems), where application functionality, memory, data storage and retrieval, and various processing functions may be operated remotely from each other over a distributed computing network, such as the Internet or an intranet.

Although specific servers are described herein, functionality may be performed by any one of the servers and are not limited to any single or combination of servers. Accordingly, in some aspects, detecting and classifying anomalies may be performed by the anomaly classification server and in some embodiments that functionality may be performed by separate servers.

Figure 1B:
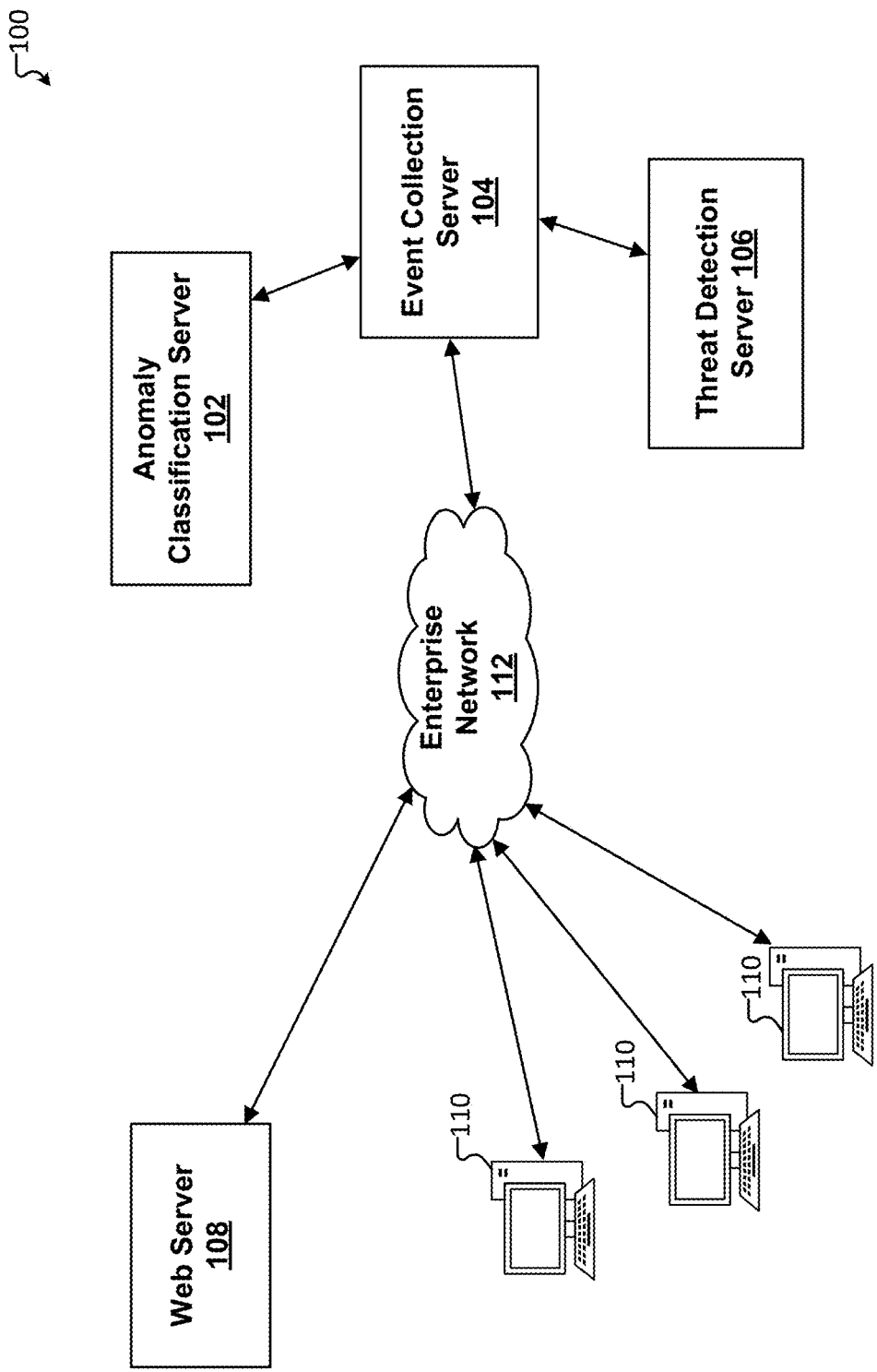
FIG. 1B illustrates another example of a system for detecting anomalies in an enterprise network.

FIG. 1B illustrates another example of a system 100 for detecting anomalies in an enterprise network.

This example system 100 includes an anomaly classification server 102 in communication with an event collection server 104, a threat detection server 106 also in communication with the event collection server 104, a web server 108, one or more computing devices 110, and an enterprise network 112.

As described herein, the event collection server 104 collects one or more events occurring in the system 100 and may capture events and transactions occurring in the web server 106.

As also described herein, the anomaly classification server 102 trains a model to identify one or more anomalous features in one or more event logs received from the event collection server 104 using language models such as Word2Vec to represent features within event logs as vectors. The anomaly classification server may also be used to apply the trained model to detect one or more anomalous features in event logs obtained from the event collection server 104 by comparing each feature of an event log to the other contextual features within the event log to determine if each feature is normal or anomalous to its context.

In some aspects, the threat detection server 106 applies one or more enterprise rules or models to each event log containing one or more anomalous features to determine if the anomalous feature is a threat to the enterprise. In this example, the threat detection server 106 is in communication with the event collection server 104 and may obtain features containing anomalies directly therefrom. As described herein, an anomalous feature of an event log is identified based on the existence of one or more features in the event log that deviate from characteristic contextual features. In one example, the anomaly classification server 102 applies a trained model to each feature of an event log to score event logs and classify anomalies. Rules, models, or a combination thereof is thereafter applied to each event log containing an anomalous feature. Accordingly, only a smaller subset of all enterprise network communications are processed against the rules or models to detect threats. The threat detection server 106 may therefore store one or more enterprise rules applied to anomalous features to specifically identify enterprise threats.

In example aspects, the computing devices 110 can be devices operated by end users or servers either included within the enterprise network 112 or communicatively connected thereto. The computing devices 110 can be any of a variety of mobile, server, or other types of computing devices, one example of which is described below in connection with FIG. 2.

In some aspects, enterprise network 112 is a computer network such as an enterprise intranet. The example enterprise network 112 may include a Local Area Network (LAN), a Wide Area Network (WAN), the Internet, wireless and wired transmission mediums. The anomaly classification server 102 may communicate with components of the system 100 via the enterprise network 110 (e.g., an enterprise intranet). Alternatively or additionally, anomaly classification server 102 may communicate with components of the system 100 via a wide area network (e.g., the Internet). In addition, the aspects and functionalities described herein may operate over distributed systems (e.g., cloud computing systems), where application functionality, memory, data storage and retrieval, and various processing functions may be operated remotely from each other over a distributed computing network, such as the Internet or an intranet.

Although specific servers are described herein, functionality may be performed by any one of the servers and are not limited to any single or combination of servers. Accordingly, in some aspects, detecting and classifying anomalies may be performed by the anomaly classification server and in some embodiments that functionality may be performed by separate servers.

Figure 2:
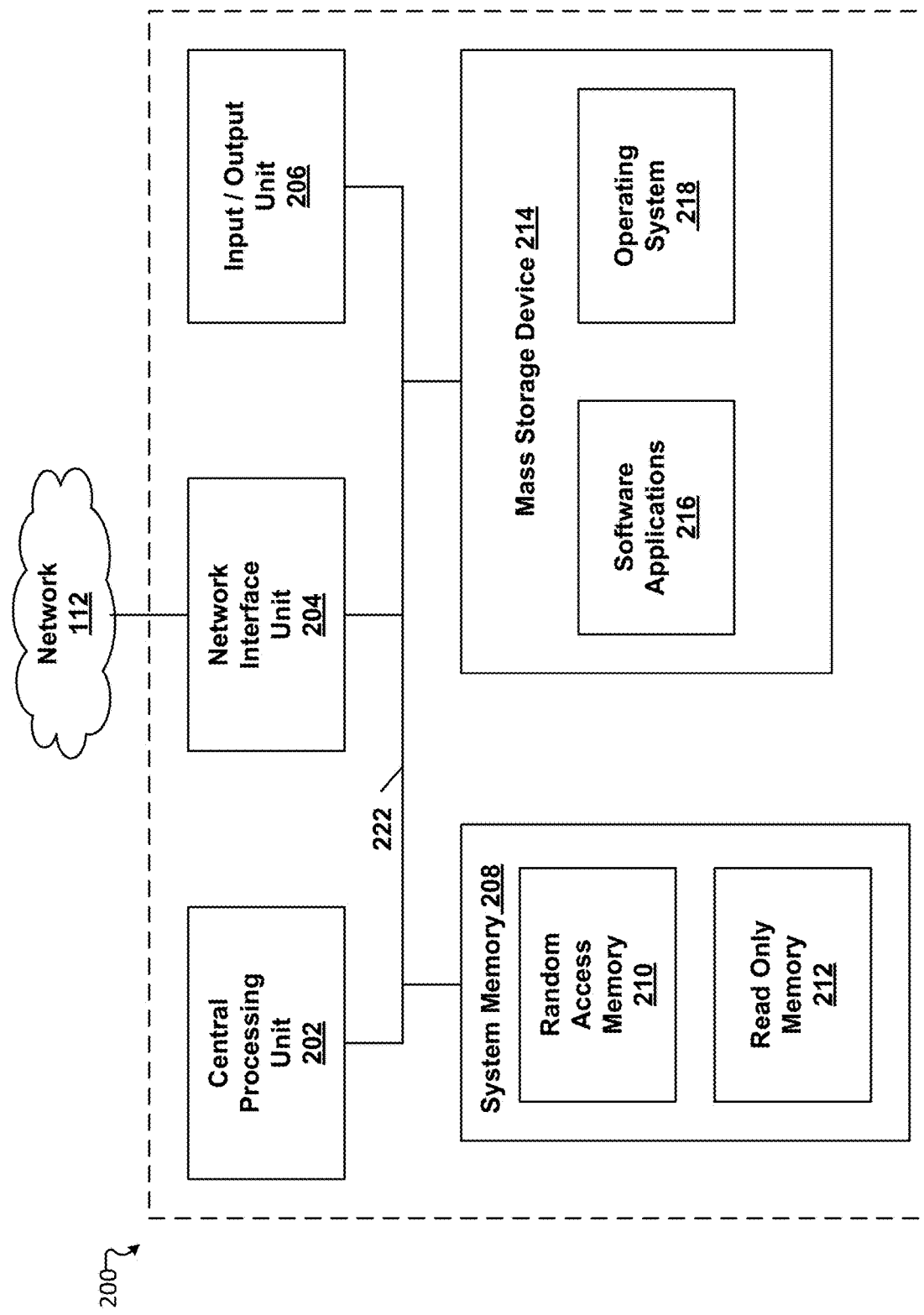
FIG. 2 illustrates an example block diagram of a computing system that is useable to implement aspects of the system of FIG. 1.

FIG. 2 illustrates an example block diagram of a computing system 200 that is useable to implement aspects of the system 100 of FIG. 1. The computing system 200 can be used to implement, for example, the anomaly classification server 102 and the threat detection server 106 of FIG. 1, in example aspects. In still further aspects, the computing system 200 can represent web server 108, event collection server 104, or computing devices 110.

In the embodiment shown, the computing system 200 includes at least one central processing unit ("CPU") 202, a system memory 208, and a system bus 222 that couples the system memory 208 to the CPU 202. The system memory 208 includes a random access memory ("RAM") 210 and a read-only memory ("ROM") 212. A basic input/output system that contains the basic routines that help to transfer information between elements within the computing system 200, such as during startup, is stored in the ROM 212. The computing system 200 further includes a mass storage device 214. The mass storage device 214 is able to store software instructions and data.

The mass storage device 214 is connected to the CPU 202 through a mass storage controller (not shown) connected to the system bus 222. The mass storage device 214 and its associated computer-readable data storage media provide non-volatile, non-transitory storage for the computing system 200. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the computing system 200.

According to various embodiments of the invention, the computing system 200 may operate in a networked environment using logical connections to remote network devices through a network 112, such as a wireless network, the Intranet, the Internet, or another type of network. The computing system 200 may connect to the network 110 through a network interface unit 204 connected to the system bus 222. It should be appreciated that the network interface unit 204 may also be utilized to connect to other types of networks and remote computing systems. The computing system 200 also includes an input/output controller 206 for receiving and processing input from a number of other devices, including a touch user interface display screen, or another type of input device. Similarly, the input/output controller 206 may provide output to a touch user interface display screen or other type of output device.

As mentioned briefly above, the mass storage device 214 and the RAM 210 of the computing system 200 can store software instructions and data. The software instructions include an operating system 218 suitable for controlling the operation of the computing system 200. The mass storage device 214 and/or the RAM 210 also store software instructions, that when executed by the CPU 202, cause the computing system 200 to provide the functionality of the anomaly classification server 102 discussed in this document. For example, in such implementations, the mass storage device 214 and/or the RAM 210 can store one or more anomaly classification models that, when executed by the CPU 202, cause the computing system 200 to classify one or more anomalous features in event logs.

Figure 3:
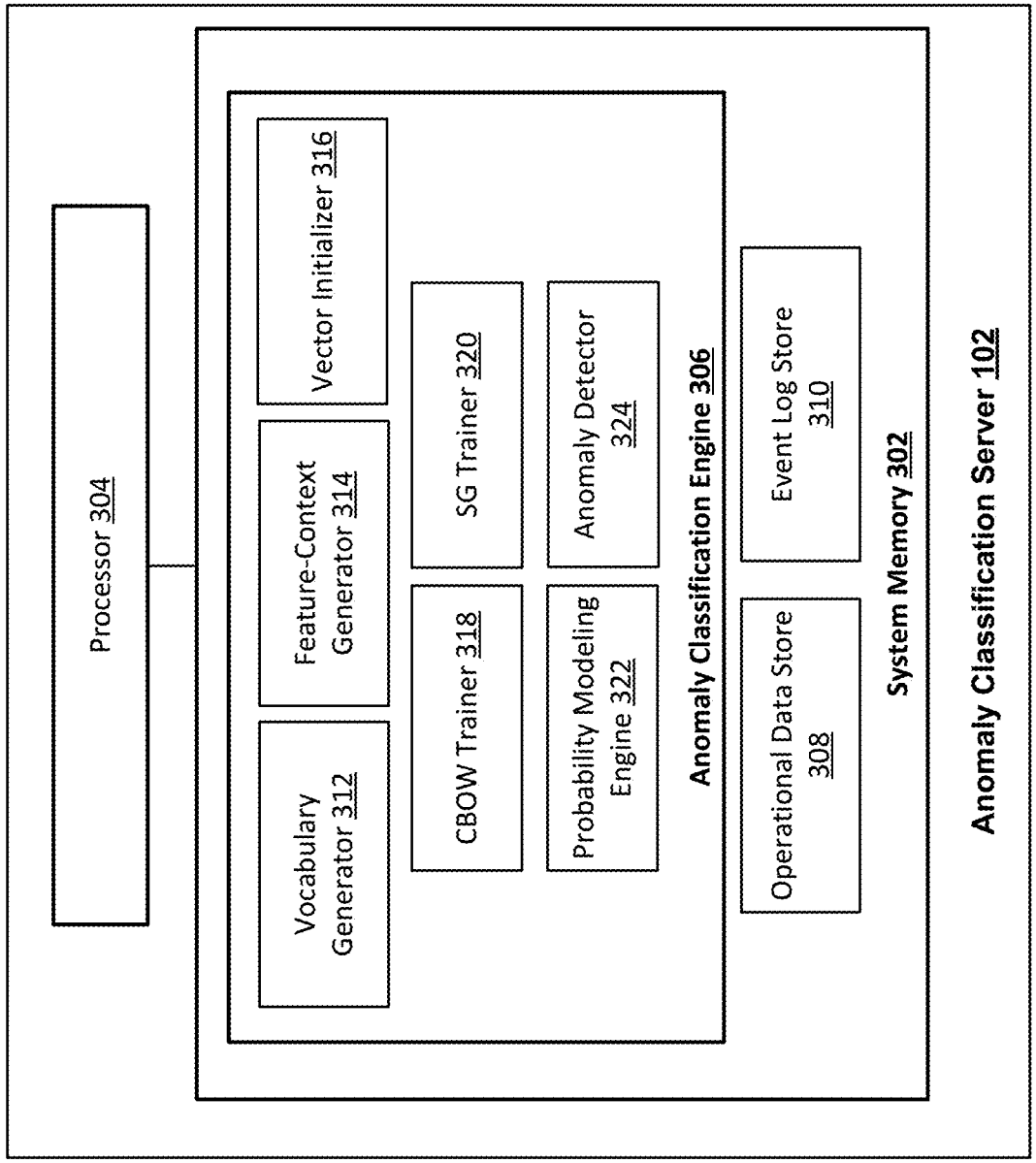
FIG. 3. illustrates a schematic block diagram of an anomaly classification server, according to an example embodiment.

FIG. 3. illustrates a schematic block diagram of an anomaly classification server 102, according to an example embodiment. The schematic block diagram illustrated herein therefore represents a particular implementation of the computing system 200 when implemented as the anomaly classification server 102.

In the example embodiment shown, the anomaly classification server 102 includes system memory 302 operatively connected to a processor 304. As further illustrated, the system memory 302 includes an anomaly classification engine 306, an operational data store 308, and an event log store 310. The operational data store 308 may store the data relating to execution of an anomaly classification server 102, such as, for example, operational program code. The operational data store 308 may store additional information to operate the anomaly classification server 102 as required.

In some embodiments, the event log store 310 may store various event logs of an enterprise. For example, HTTP logs of a web server may be logged and stored in the event log store 310. In a still further example, connection logs may be stored in the event log store 310. Still other types of event logs of interest to a user may be stored as well.

As described herein, aspects of the present disclosure describe training a model to identify regularly co-occurring features. Aspects further disclose applying the trained model to identify anomalous features that are not regularly occurring in an event log. Accordingly, in some embodiments, the anomaly classification server 102 trains one or more models to identify anomalous features and also applies those models to one or more event logs to detect anomalous features.

Thus, in this example, the anomaly classification engine includes a vocabulary generator 312, a feature-context generator 314, a vector initializer 316, a CBOW trainer 318, a SG trainer 320, a probability modeling engine 322, and an anomaly detector 324.

As described herein, an event log may comprise one or more features. In one example, each event log E may be decomposed into M features where $E=[e_1, e_2, \ldots e_M]$. In one example, the vocabulary generator 312 parses all event logs to generate a vocabulary of size V. In such an example, vocabulary of size V comprises all unique features in all event logs. For example, if each feature could only be represented by a single letter of the alphabet, the vocabulary would be twenty-six entries in length (A-Z).

The feature-context generator 314 defines each feature as a vector of size V, wherein the vector for each feature comprises zeros in all positions except for a one in the position corresponding to the particular feature. Accordingly, for each feature in the event log, all other features are represented as context (i.e., zeros). Accordingly, the feature-context generator 314 generates M number of feature-context pairs for each event log.

The vector initializer 316 generates a unique vector representation for each unique feature. In one embodiment, the vector initializer 316 initializes each feature to an N-dimensional vector. In particular, the vector initializer 316 generates a V×N size matrix that stores the vector representations of each unique feature (i.e., for V unique features). In one example, the V×N matrix is referred to as W. In some embodiments, the $i^{th}$ N-dimensional column of the matrix corresponds to the word embedding for the corresponding feature in the vocabulary. In other words, the position of the particular feature in the corresponding column of the W V×N matrix stores the word embedding, or the vector representation of the particular feature. Put another way, $W=v^1, v^2, \ldots v^V$. Accordingly, the matrix W can be represented as a matrix of vector representations for each feature/word, where $v_i=[W_{i,1}, W_{i,2}, W_{i,3} \ldots W_{i,M}]$.

Additionally, in some examples, Word2Vec type of language models may be used to train the generated model. In particular, the model may be trained to either predict features or context. In one example, the language model Continuous Bag of Words (CBOW) is used to train the model to predict features. Accordingly, a CBOW model trainer 318 may be used to train the model such that one or more contextual features are input and a corresponding feature is predicted. Alternatively, the language model entitled Skip-gram (SG) may also be used to train the model to predict context. In such an example, the SG model trainer 320 may be used to train the model such that a feature is input and corresponding one or more contextual features are predicted.

As described herein, the trained model may be used to determine whether an event log contains an anomalous feature. In particular, the trained model may be used to score event logs and classify anomalies. In some embodiments, for every event log $E=[e_1, e_2, \ldots e_M]$, there are M number of feature-context pairs corresponding to each feature. The probability modeling engine 322 uses the trained model to provide an output probability. In some embodiments, the probability modeling engine 322 determines if each feature in an event log is normal or anomalous to its contextual features. In one example, the probability modeling engine 322 uses the trained model to score event logs and classify anomalies. In particular, the probability modeling engine 322 may compare each feature in an event log to each contextual feature to generate a probability score that such feature and contextual feature is proper or improper. If a feature fits within the context of the event log, the probability score of that feature will be closer to 1. If, alternatively, the feature does not fit within the context, the probability score of that feature will be closer to 0, thereby indicating it is an anomalous feature. Thus, the probability modeling engine 322 may use the trained model to assign a probability score to each probability.

In one example, the anomaly detector 324 may use the probability score assigned by the probability modeling engine 322 to detect whether an anomaly exists. For example, the anomaly detector 324 may apply a threshold to the probability score to flag anomalous features. In an example embodiment, the anomaly detector 324 may only flag features as being anomalous if they correspond to a probability score of less than 0.0001. In other embodiments, other thresholds may be used and may be dependent on the enterprise's needs. For example, a probability threshold may depend on the level of sensitivity that the enterprise wishes to implement. In other words, the lower the probability threshold, the fewer anomalous features may be flagged, whereas the higher the probability threshold, more anomalous features may be flagged. Each event log having one or more flagged anomalous features based on the probability threshold is thereafter processed against rules to determine whether the event is in fact a threat. Accordingly, anomalies may be quickly detected using a trained model as described herein. Determining whether such anomalies actually relate to an enterprise threat depends on the one or more rules that may be applied to such event logs.

In still further implementations, the probability score output by the probability modeling engine 322 can be formatted or scaled differently, and different types of thresholds could be set by the anomaly detector 324. For example, probabilities could be represented as logit scores to weight edge cases more heavily, and allow a finer control over threshold-setting. Other probability score approaches could be used as well.

As illustrated in Table 1, below, an example application of the trained model illustrates finding anomalous words in a sentence that corresponds to the event log as described herein.

TABLE 1

Finding anomalous words in a sentence using the trained model

| family | happy  | mother | father | son    | love   | daughter  |
|--------|--------|--------|--------|--------|--------|-----------|
| -1.251 | -1.632 | -0.100 | -1.632 | 1.632  | -1.054 | 0.150     |
| family | happy  | mother | father | son    | love   | terrorist |
| -1.684 | -1.574 | -0.472 | -1.574 | 0.590  | -1.087 | -3.654 |
| saddam | hussein| oil    | war    | iraq   | fight  | weapon    |
| 0.366  | 0.338  | -1.226 | -0.886 | 2.661  | -1.766 | 0.913     |
| saddam | hussein| oil    | war    | iraq   | fight  | girl  |
| -0.141 | -0.120 | -2.477 | -1.940 | 1.502  | -2.219 | -5.049 |
| girl   | boy    | love   | flower | school | building | terrorist |
| -1.092 | -0.736 | -1.865 | -2.155 | -3.374 | -3.154 | -5.957 |
| girl   | boy    | love   | flower | school | building | learn   |
| -0.624 | -0.701 | -0.778 | -1.983 | -2.226 | -3.752 | -3.950    |
| elderly| man    | old    | age    | poor   | health | checkup   |
| -1.390 | 1.636  | -0.122 | 1.500  | 2.091  | 1.267  | 0.459     |
| elderly| man    | old    | age    | poor   | health | hospital  |
| -1.971 | 1.092  | -0.256 | 1.060  | 2.008  | 1.810  | -0.682    |
| elderly| man    | old    | age    | poor   | health | ferrari |
| -1.951 | 1.144  | -0.383 | 0.853  | 1.603  | 0.585  | -4.907 |
| mother | son    | love   | house  | cook   | food   | like      |
| -0.637 | -2.452 | -1.363 | -2.173 | -1.498 | -1.455 | -1.292    |
| mother | daughter| love  | house  | cook   | food   | like      |
| -0.621 | -1.978 | -0.600 | -1.501 | -1.612 | -1.089 | -1.313    |
| mother | daughter| love  | house  | cook   | food   | stealing |
| -0.541 | -1.363 | -2.917 | -1.482 | -1.730 | -1.400 | -4.252 |

In examples described herein, the disclosed model identifies anomalous features in event logs. Table 1 shows an example application of the model applied to sets of seven words included in a sentence. By way of analogy, an event log could be thought of as a sentence while each word in the sentence could be thought of as a feature. As described herein, the trained model may be used to score each word/feature in a sentence/event log and classify anomalies therein. In particular, each word/feature in a sentence/event log is compared to each contextual word/feature to generate a probability score that such word/feature and contextual word/feature is proper or improper. In this example, the table shows a number (based on the probability) for each word in the sentence. If a word fits within the context of the sentence, the probability score of that word will be higher. If, alternatively, the word does not fit within the context of the other words of the sentence, the probability score of that word will be very low, thereby indicating it is an anomalous word. Thus, based on application of the trained model, the words in bold are indicative of an anomaly. In other words, each word in bold represents an unlikely word in the sentence. Note that the word "unlikely" may refer to unlikeliness of an event occurring in natural text. As described herein, rules may be applied to each individual sentence that includes one or more anomalous words to determine whether that sentence does actually include an anomaly.

As illustrated in the example sentences in Table 1, above, it is seen that low (highly-negative) logit scores are generated based on a trained dataset using an exhaustive training data set of sentences in the English language. In particular, the training dataset for this example included a controlled set of known-anomalous "negative examples" which can be inserted into training data, and used to help strengthen a negative correlation between words that are not commonly used together. In each of the above example sentence pairs or groups, a last word in one of the "sentences" of seven words in each group of sentences appears out of context due to low logit scores. Those low logit scores identify the sentences as anomalous, and classifying those words (e.g., "terrorist", "girl", "terrorist", "ferrari" and "stealing") as being the feature resulting in the anomaly being detected in that particular sentence, or event log.

Figure 4A:
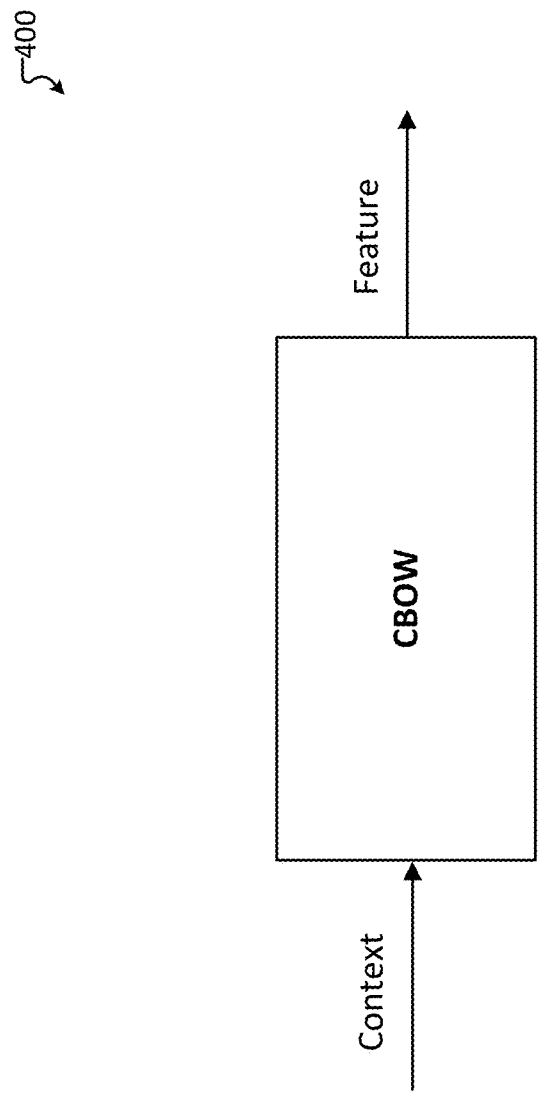
FIG. 4A illustrates an example block diagram depicting Continuous Bag of Words (CBOW) modeling language.

FIG. 4A illustrates an example block diagram depicting Continuous Bag of Words (CBOW) 400 modeling language.

As described herein, the disclosed approach is capable of applying one of at least two training models: Continuous Bag of Words (CBOW) and Skip-Gram (SG). As illustrated in FIG. 4A, CBOW is used to train the model to predict features using context as inputs to the model. In particular, CBOW predicts a missing feature given a window of context features or a sequence of context features.

Like Word2Vec, CBOW also uses a second vector representation to represent each feature $X^i$ in the vocabulary V to train the model. In particular, the secondary feature-vector representation for each feature may be provided in a second matrix, Q, which is another N×V matrix. In particular, $v'^i = [\Omega_{1,i}, \Omega_{2,i}, \ldots \Omega_{N,i}]$. The model is trained to output the probability of the occurrence of feature-context pairs in which context is input. CBOW enables modeling the output probability of the occurrence of feature-context pairs, $P(X^i | C^i)$ (where X denotes the feature and C denotes the context). The product $H^i \Omega$ (wherein $H^i$ denotes the average of the feature-vector representations of the context, C) generates a 1×V vector, Y, wherein $Y = [y_1, y_2, \ldots y_V]$.

In some embodiments, a softmax is applied to the V outputs obtained from the product $H^i \Omega$ to obtain probabilities. In particular, an output probability of feature $x_i$ given the event E is obtained. Thus, CBOW aims to increase the actual output feature probabilities.

While training, for each proper feature-context pair, the output probability is labeled as a 1, while improper feature-context pairs are labeled as 0. In some embodiments, weights are adjusted accordingly using gradient descent. Therefore, while testing, the values close to 0 are indicative of improper context (e.g., an anomaly), while values close to 1 are indicative of normal features in an event log.

Figure 4B:
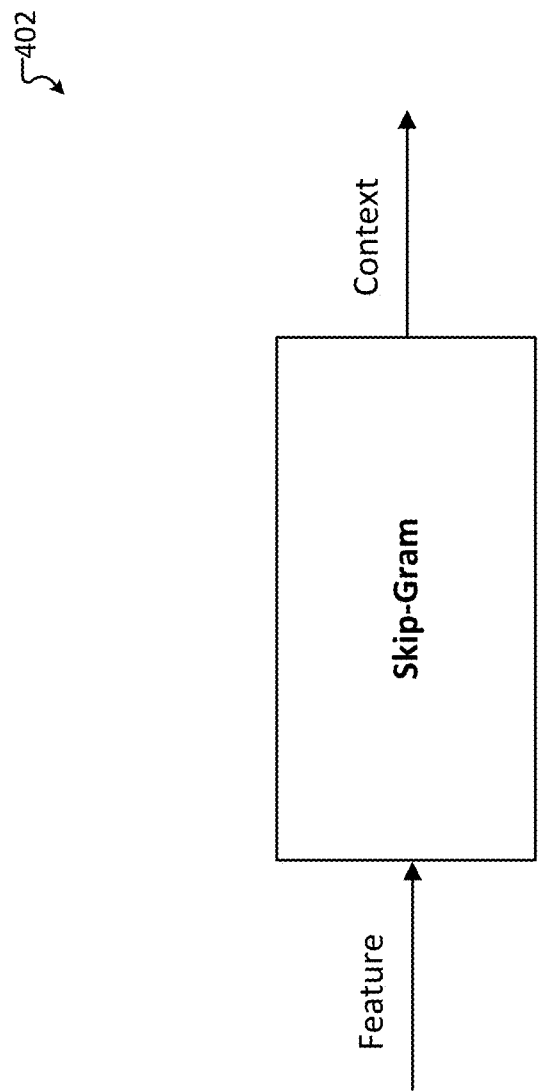
FIG. 4B illustrates an example block diagram depicting Skip-Gram (SG) modeling language.

FIG. 4B illustrates an example block diagram depicting Skip-Gram (SG) 500 modeling language.

The example illustrated in FIG. 4A depicted training the model using CBOW, while this example illustrated in FIG. 4B depicts training the model using SG. Unlike CBOW, SG is used to train the model to predict context using features as inputs to the model. In particular, SG predicts one or more context features for any given feature. Accordingly, a feature $X^i$ may be input into the model and one or more context $C^i$ features are obtained as outputs using the SG model. Other than the opposite input-output pair, SG functions similar to CBOW.

Figure 5:
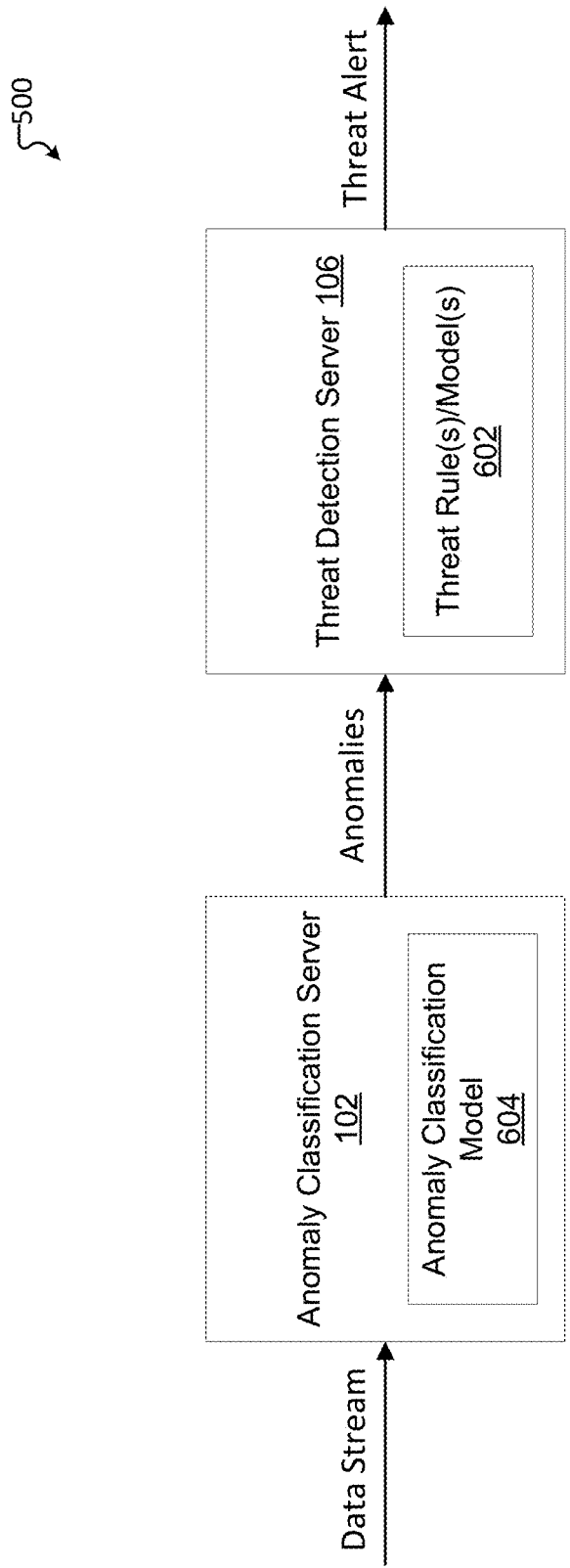
FIG. 5 illustrates an example block diagram depicting a flow 500 of the anomaly classification system.

FIG. 5 illustrates an example block diagram depicting a flow 500 within a threat detection system that includes an anomaly classification system such as the one disclosed herein.

Threats to an enterprise's network may originate from external users or even internal users accessing the enterprise system. An objective of the system described herein is to provide an efficient method for detecting threats in an enterprise network. The example flow 500 depicts the interaction of the anomaly classification server 102 with the threat detection server 106. In particular, the anomaly classification server 102 accepts, as input, a data stream comprising one or more event logs. In some embodiments, the data stream comprises event logs received from, for example, an HTTP web server or some other connection log (e.g., FTP, SMTP, etc.). The anomaly classification server quickly identifies anomalies occurring in the data stream using an anomaly classification model 604. In particular, the anomaly classification model 604 may be used to quickly flag anomalous features in the one or more event logs by identifying those features that do not fit within the contextual features of the event log.

Each event log containing at least one anomalous feature is passed to the threat detection server. The threat detection server applies one or more threat rules or models 602 on each event log to determine whether the event log contains a threat. Such rules or models may be enterprise specific, whereas other rules or models may globally detect threats. If a threat is detect, a threat alert is presented. In some embodiments, a threat alert may be presented to one or more enterprise units having personnel or systems that can appropriately address the threat. If, however, no threat is detected, no threat alert is presented. In some embodiments, the model may be trained, over time, to learn whether to flag similar features as being anomalous or not based on the result of the applied rule. In some examples, the model may be updated in response to a change in an applied rule that results in the detection of more or fewer threats.

Figure 6:
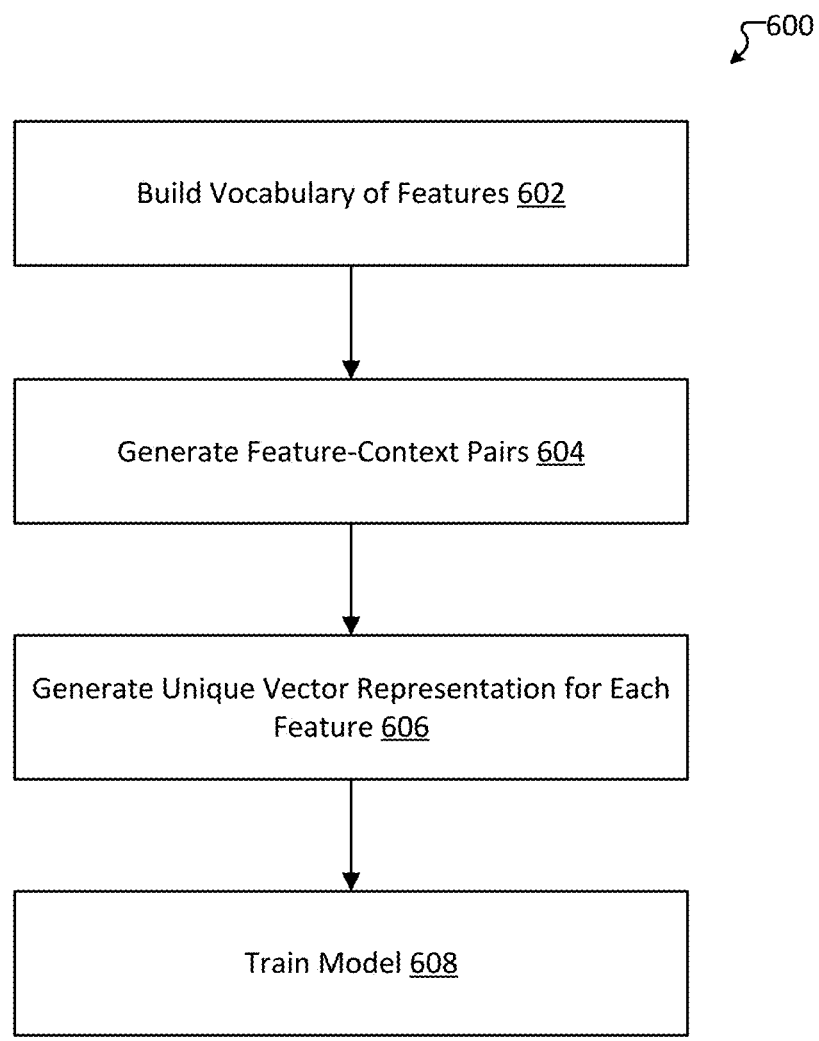
FIG. 6 illustrates a method for generating and training a model to detect and classify anomalies in event logs.

FIG. 6 illustrates a method 600 for generating and training a model to detect and classify anomalies in event logs.

In some embodiments, the method 600 may be performed by the anomaly classification server (e.g., anomaly classification server 102 illustrated in FIG. 1). In operation 602, the anomaly classification server builds a vocabulary of features. As described herein, each event log comprises one or more event features (e.g., event log E may be decomposed into M features where $E=[e_1, e_2, \ldots e_M]$.). Accordingly, the anomaly classification server may build a vocabulary of features, wherein the vocabulary is of size V and includes all unique features in one or more event logs under investigation.

In operation 604, the anomaly classification server generates a matrix of feature-context pairs. Each feature may be defined as a vector of size V, wherein the vector for each feature comprises zeros in all positions except for a one in the position corresponding to the particular feature. Accordingly, for each feature in the event log, all other features are represented as context (i.e., zeros). Accordingly, in operation 604, the anomaly classification server generates M number of feature-context pairs for each event log, wherein M represents the number of total unique features in the one or more event logs under investigation.

In operation 606, the anomaly classification server generates a unique vector representation for each feature. In one embodiment, each unique feature may be initialized to an N-dimensional vector such that a V×N size matrix, referred to as W, is generated. The V×N matrix may store the vector representations of each unique feature (i.e., for V unique features, each of dimension N). In some embodiments, the $i^{th}$ N-dimensional column of the V×N matrix corresponds to the word embedding for the corresponding feature in the vocabulary. In other words, the position of the particular feature in the corresponding column of the W V×N matrix stores the word embedding, or the vector representation of the particular feature. Where $W=v^1, v^2, \ldots v^V$. Accordingly, the matrix W can be represented as a matrix of vector representations for each feature/word, where $v_i=[W_{i,1}, W_{i,2}, W_{i,3} \ldots W_{i,M}]$.

In operation 608, the anomaly classification server trains the model. In some examples, Word2Vec type of language models may be used to train the generated model. In particular, the model may be trained to either predict features or context. In one example, the language model Continuous Bag of Words (CBOW) is used to train the model to predict features. Accordingly, using CBOW, the model may be trained such that one or more contextual features are input and a corresponding feature is predicted. Alternatively, the language model entitled Skip-gram (SG) may also be used to train the model to predict context. Accordingly, using SG, the model may be trained such that a feature is input and corresponding one or more contextual features are predicted.

As should be appreciated, operations 602-608 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 7:
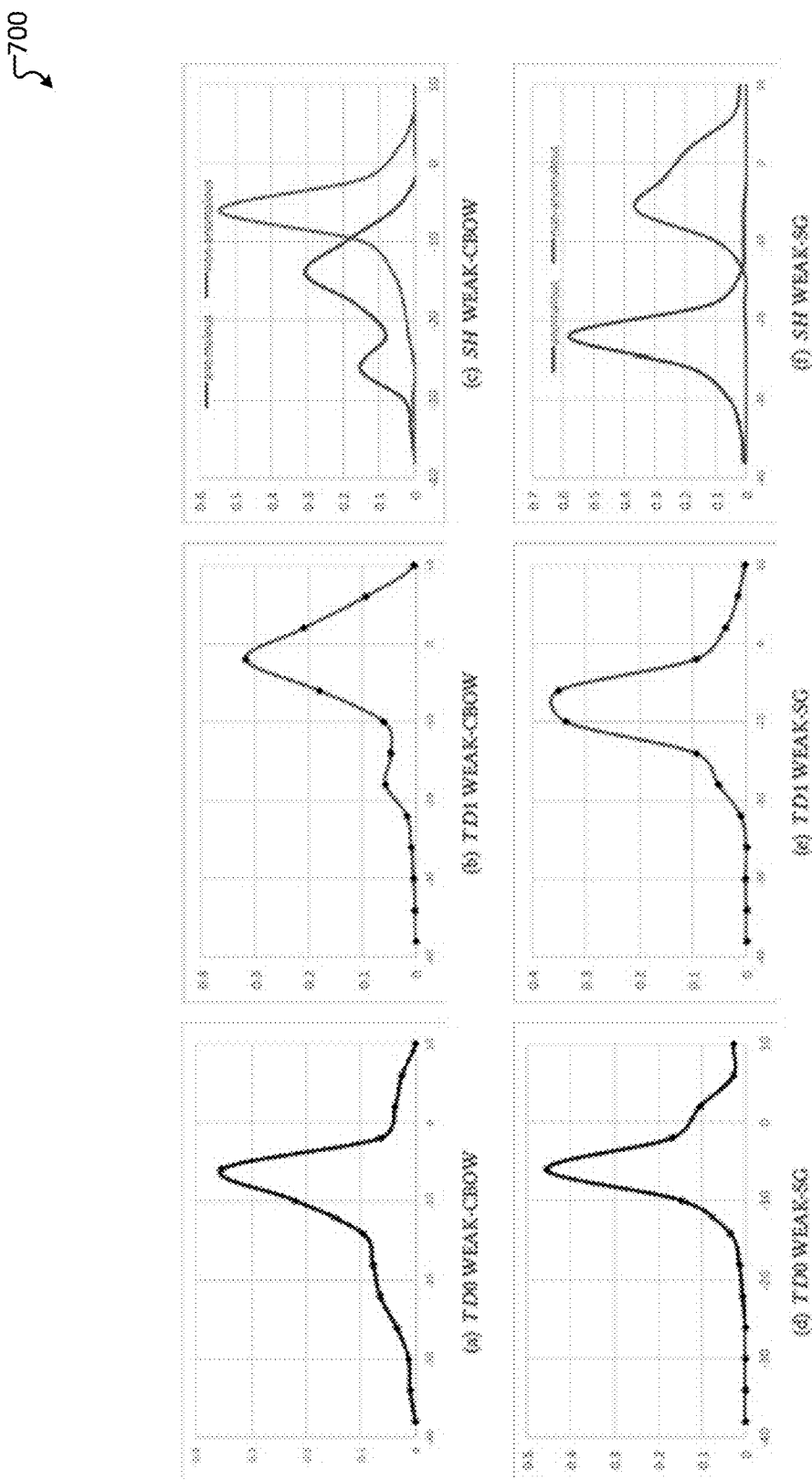
FIG. 7 illustrates performance of the model applied to detecting anomalies in a collection of HTTP event logs.

FIG. 7 illustrates performance of the model applied to detecting anomalies in a collection of HTTP event logs.

The following examples illustrate the effectiveness and accuracy of the model in detecting and classifying anomalies. In the example illustrated in FIG. 7, the model is applied to a collection of HTTP event logs that were recorded from an enterprise network. Event logs in the collection may be generated based on an interaction of devices in enterprise stores, distribution centers, and offices. The devices may communicate with other devices inside the enterprise or with devices external to the enterprise. In this example, only those event logs corresponding to outbound traffic are considered, resulting in a collection of close to 59,000 event logs. Several datasets were prepared to observe the logit scores and to also decide an appropriate threshold. In some examples, an anomaly may be flagged based on a device accessing a suspicious website, a device accessing an atypical website that it would not normally access, a device having unusual communication patterns, a device accessing websites having hardcoded useragent strings, etc.

TABLE 2

Summary of Testing Datasets

| Name of dataset | Details |
|---|---|
| TD0 | Dataset containing 100 most frequent event logs in our dataset. Each such event occurs more than 300 times, thus the model should be amply trained with these logs. |
| TD1 | Dataset containing 100 most infrequent event logs in our dataset. Each such event occurs only 1 time, thus the model may be least trained with this log. |
| SH | Dataset containing 100 most frequent event logs in our dataset with one field randomly shuffled with its infrequent occurrence. The randomly shuffled field should be detected as an anomaly. |
| SH-i | The $i^{th}$ field of TD0 is shuffled with least frequent occurrences of that field type in the vocabulary. |

Table 2 illustrates the datasets used to test the trained model. In this example, four datasets are provided: TD0, which is a dataset of the 100 most frequent event logs; TD1, which is a dataset of the 100 more infrequent event logs; SH, which is a dataset of 100 most frequent event logs with one field randomly shuffled with an infrequent occurrence; and SH-i is the TD0 dataset wherein the $i^{th}$ field is shuffled with least frequent occurrences of that field type in the vocabulary.

Observations of the model applied to the different datasets are illustrated in FIG. 7. Graphs (a)-(c) represent the performance of the model trained with the CBOW language model as applied to the different datasets, while graphs (d)-(f) represent the performance of the model trained with the SG language model as applied to the different datasets. As illustrated, the graphs for (a) and (d) (illustrating the model applied to dataset TD0, which represents the most frequent event logs) and (b) and (e) (illustrating the model applied to dataset TD1, which represents the most infrequent event logs) are similar, which indicates that the model does not consider infrequent event logs as being an anomaly.

Furthermore, when arbitrary feature values are introduced, as in the SH dataset (corresponding to graphs (c) and (f)), the logit scores for the model are lower for the CBOW trained model (i.e., graph (c)) compared to the SG trained model (i.e., graph (f)) in detecting the anomalous feature. The SG trained model provides a distinct separation between the distribution corresponding to the anomalous feature and the non-anomalous features, while the CBOW trained model provides overlap between the distribution corresponding to the anomalous feature and the non-anomalous features. A threshold value of −20 was selected to represent an anomaly to ensure a high detection rate for true positives in graph (f) and to also ensure a low detection rate for false positives in graphs (d) and (e). As illustrated, the SG trained model may be used to separate anomalous features from non-anomalous features.

Figure 8:
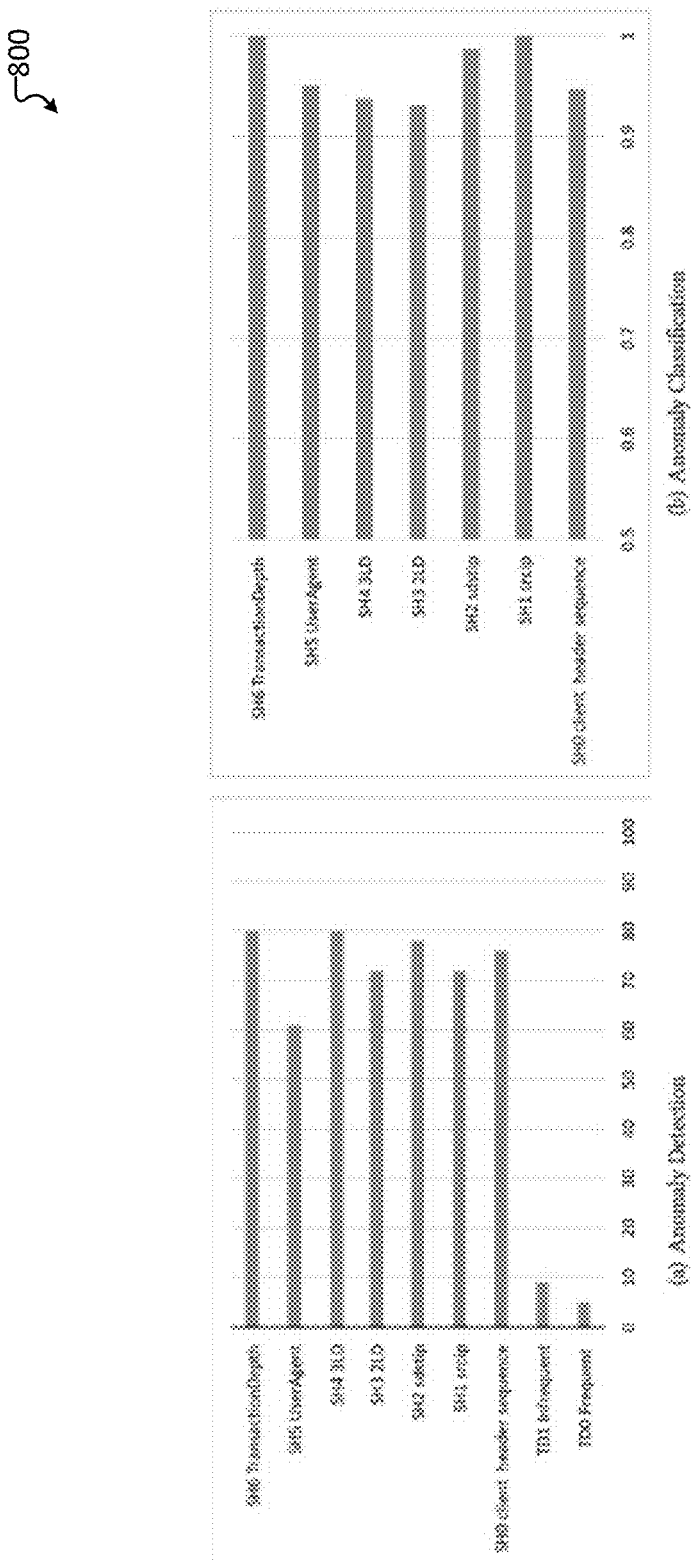
FIG. 8 illustrates anomaly detection and anomaly classification performance results of the model applied to HTTP event logs.

FIG. 8 illustrates anomaly detection and anomaly classification performance results of the model applied to HTTP event logs.

As illustrated, the performance results relating to detection of anomalies and classification of anomalies using the trained model are high. Chart (a) shows a high accuracy in detecting anomalies for each dataset (about 60-80%) and chart (b) shows a high accuracy in identifying the anomalous feature (close to 100%).

In another embodiment, the model was also tested to determine whether it could identify anomalies when more than one feature in an event log was anomalous. In one example, two scenarios were tested: (a) a device logging into a service from a different user agent (resulting in two anomalous features), and (b) a device accessing an unusual website (resulting in three anomalous features). The results are shown in Table 3, below.

|     | NS = 5 Detection | NS = 5 Classification | NS = 10 Detection | NS = 10 Classification |
| --- | --- | --- | --- | --- |
| (a) | 22 | 25 | 96 | 25 |
| (b) | 41 | 65 | 98 | 60 |

The detection of anomalous features in scenario (b) was higher than the detection of anomalous features in scenario (a). However, with more training (i.e., higher negative sampling), most anomalous features may be detected.

Figure 9:
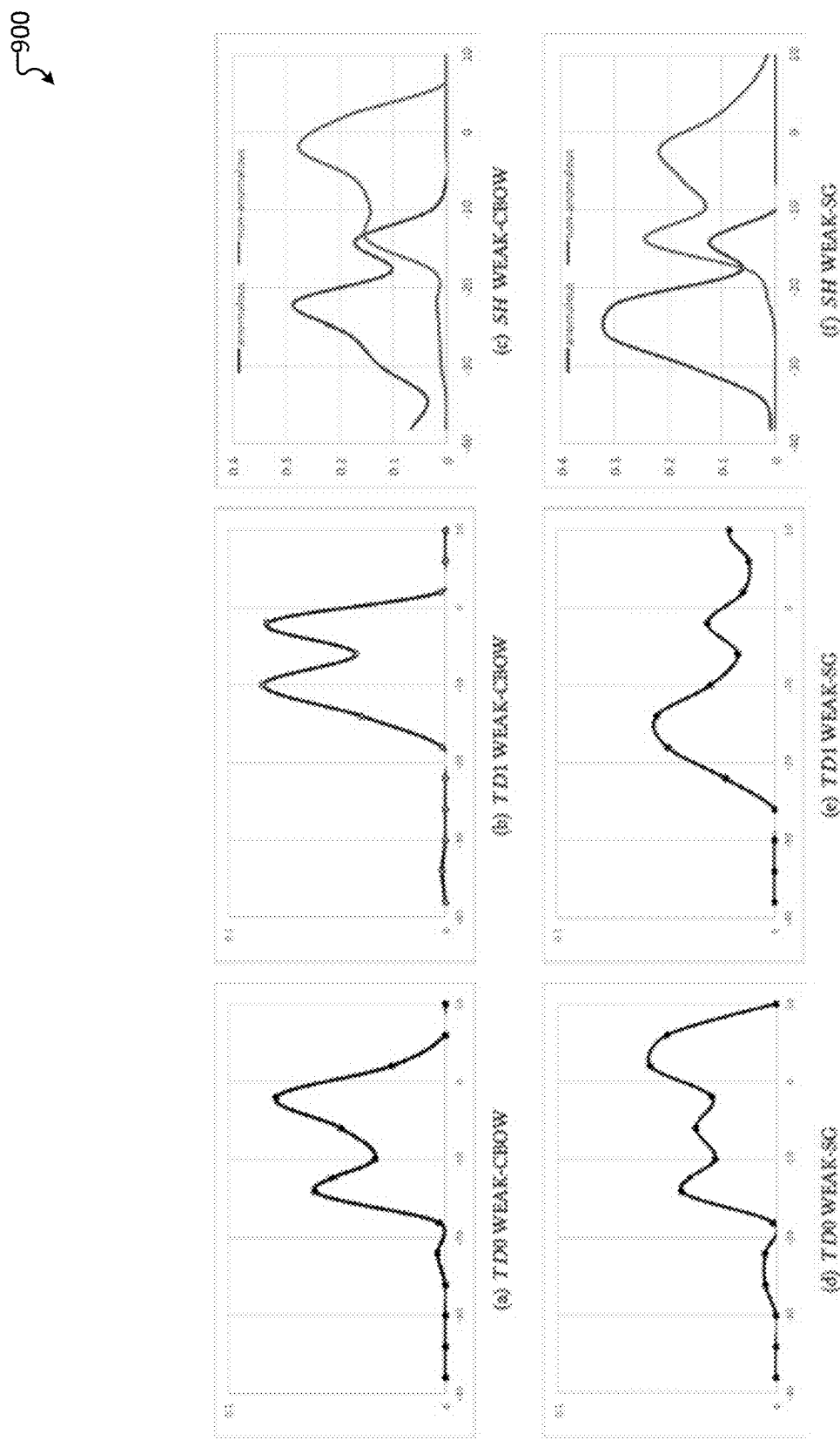
FIG. 9 illustrates the performance of the model trained with SG and CBOW language models applied to detecting anomalies in connection logs.

FIG. 9 illustrates the performance of the model trained with SG and CBOW language models applied to detecting anomalies in connection logs.

The examples illustrated in FIG. 9 show the effectiveness and accuracy of the model in detecting and classifying anomalies. In the example illustrated in FIG. 9 (and similar to the example illustrated in FIG. 7), the model is applied to a collection of connection event logs that were recorded from an enterprise network. Connection event logs may be, for example, connection types such as HTTP, FTP, SMTP, and others. In this example, only event logs corresponding to outbound traffic are considered. Similar to FIG. 7, several datasets were prepared to observe the logit scores and to also decide an appropriate threshold.

Observations of the model applied to the different datasets are illustrated in FIG. 9. Graphs (a)-(c) represent the performance of the model trained with the CBOW language model as applied to the different datasets, while graphs (d)-(f) represent the performance of the model trained with the SG language model as applied to the different datasets. As illustrated, the graphs for (a) (illustrating the CBOW trained model applied to dataset TD0, which represents the most frequent event logs) and (b) (illustrating the CBOW trained model applied to dataset TD1, which represents the most infrequent event logs) are similar, which indicates that the model does not consider infrequent event logs as being an anomaly for the CBOW trained model. Relatedly, the SG-trained model as applied to the same datasets illustrated in graphs (d) and (e) show that the distribution for the TD1 dataset shifts to the left, leading to more false positives.

Furthermore, when arbitrary feature values are introduced, as in the SH dataset (corresponding to graphs (c) and (f)). Graph (c) relating to the CBOW trained model shows a lower false positive rate and a lower detection rate while the SG trained model shows a better separation of anomalous event logs from non-anomalous event logs. The anomaly detection accuracy of the SG trained model is close to 75%, while it is 55% for the CBOW trained model.

Figure 10:
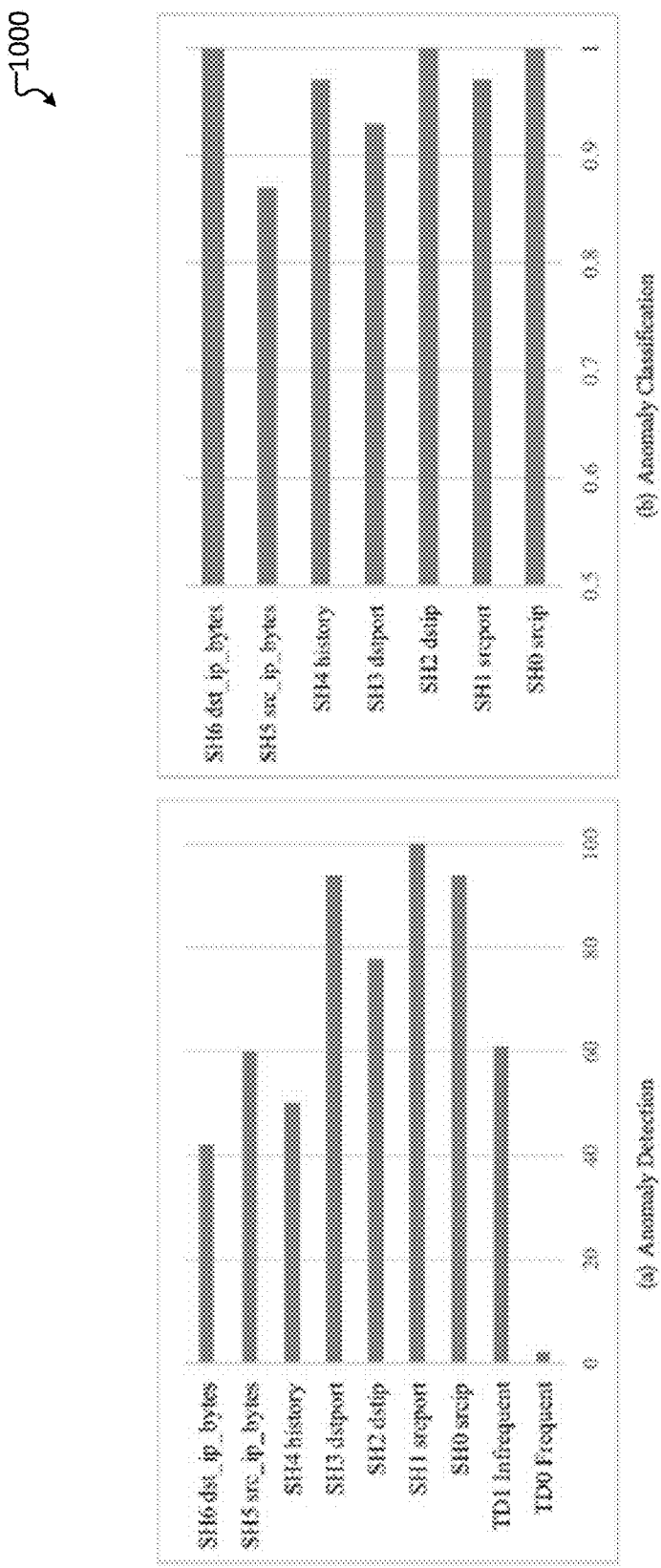
FIG. 10 illustrates anomaly detection and anomaly classification performance results of the model applied to connection logs.

FIG. 10 illustrates anomaly detection and anomaly classification performance results of the model applied to connection logs.

As illustrated, the performance results relating to detection of anomalies and classification of anomalies using the trained model are high. Chart (a) shows a high accuracy in detecting anomalies for each dataset (from 40-100%) and chart (b) shows a high accuracy in identifying the anomalous feature (from about 85% to 100%).

Accordingly, provided herein is an approach to representing features within event logs as vectors in order to find the most dissimilar or unusual feature. Thus, the approach described may be used to detect anomalies in data sets. The approach also has wide applicability, and can be implemented in many enterprise applications such as network security, fault detection in safety critical systems, or to baseline normal data traffic. Still further applications exist in other contexts where event logs may contain a related set of attributes as features which can be analyzed to determine whether each attribute contextually fits within the event log, or should be flagged as anomalous. Examples of other contexts in which event logs may be analyzed include computing system event logs, authentication event logs, or any other log containing data that can be characterized into discrete values for determining contextual relationships among the attributes in each event log.

The approach not only detects anomalous features, but it also classifies them, so as to easily run rules on those event logs containing the one or more anomalous feature to confirm or refute such results. Thus, the approach may be implemented as an initial, and fast defense to detecting and classifying anomalies. In the absence of this approach in the enterprise network context, enterprise systems must pass all event logs through a cascade of rules (may easily be hundreds of rules) to determine whether the event log is harmful, causing computational lag and inefficiency. Thus, the described approach allows identification and classification of anomalies in a fast two-step approach and is suitable for large streaming datasets (on the order of 1 million events per second, as an example).

The description and illustration of one or more aspects provided in this disclosure are not intended to limit or restrict the scope of the disclosure as claimed in any way. The aspects, examples, and details provided in this application are considered sufficient to convey possession and enable others to make and use the claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The invention claimed is:

1. A method for training and applying a model to detect and classify anomalies in event logs, the method comprising:
building a vocabulary of one or more unique features across a collection of event logs;
for each event log of a plurality of event logs included in the collection of event logs:
generating a matrix of feature-context pairs for each unique feature, the matrix of feature-context pairs comprising a matrix of the features represented as vectors; and
generating a unique vector representation of each feature for each feature-context pair by:
initializing each feature to an N-dimensional vector; and
generating a V×N-dimension matrix that stores the vector representation of each feature, wherein the unique vector representation of each feature is a vector of size V;
training the model using the vector representation of each feature to identify a contextual likelihood of each possible feature-context pair;
applying the trained model to a second collection of event logs to generate a classification score for each feature within each event log, the classification score representing a contextual likelihood of the feature appearing within the context included in that event log; and
based on the classification score of a feature within a particular event log being outside a predetermined threshold:
identifying the particular event log having the feature as containing an anomaly; and
classifying the feature as being anomalous.

2. The method of claim 1, wherein the vector representation of each feature stored in the V×N-dimension matrix is represented in a column corresponding to a position of the feature in the event log.

3. The method of claim 1, wherein training the model is performed using a Continuous Bag of Words language model.

4. The method of claim 1, wherein training the model is performed using a Skip-Gram language model.

5. The method of claim 1, wherein training and applying the model are performed on a server.

6. The method of claim 1, wherein training is performed on a first server and applying the model is performed on a second server different from the first server.

7. The method of claim 1, further comprising:
applying one or more rules to each identified event log having the feature as containing an anomaly; and
based on identifying a threat from applying the one or more rules, generating an alert.

8. A system for training and applying a model to detect and classify anomalies in event logs, the system comprising:
a computing device including a processor, a memory communicatively coupled to the processor, and a content output device, the memory storing instructions executable by the processor to:
build a vocabulary of one or more unique features across a collection of event logs;
for each event log of a plurality of event logs included in the collection of event logs:
generate a matrix of feature-context pairs for each unique feature, the matrix of feature-context pairs comprising a matrix of the features represented as vectors; and
generate a unique vector representation of each feature for each feature-context pair by:
initializing each feature to an N-dimensional vector; and
generating a V×N-dimension matrix that stores the vector representation of each feature, wherein the unique vector representation of each feature is a vector of size V;
train the model using the vector representation of each feature to identify a contextual likelihood of each possible feature-context pair;
apply the trained model to a second collection of event logs to generate a classification score for each feature within each event log of the second collection, the classification score representing a contextual likelihood of the feature appearing within the context included in that event log;
based on the classification score of a feature within a particular event log being outside a predetermined threshold:
identify the particular event log having the feature as containing an anomaly; and
classify the feature as being anomalous;
verify each identified event log containing an anomaly; and
based on an identification of a threat from application of the one or more rules, generate an alert.

9. The system of claim 8, wherein verifying each identified event log containing an anomaly comprises applying at least one of a rule and a model to each identified event log.

10. The system of claim 9, wherein applying the one or more rules is performed on a second server separate from the first server.

11. The system of claim 8, wherein the vector representation of each feature stored in the V×N-dimension matrix is represented in a column corresponding to a position of the feature in the event log.

12. The system of claim 8, wherein training the model is performed using a Continuous Bag of Words language model.

13. The system of claim 8, wherein training the model is performed using a Skip-Gram language model.

14. A method for training and applying a model to detect and classify anomalies in event logs, the method comprising:
building a vocabulary of one or more unique features across a collection of event logs;
for each event log of a plurality of event logs included in the collection of event logs:

generating a matrix of feature-context pairs for each unique feature, the matrix of feature-context pairs comprising a matrix of the features represented as vectors; and generating a unique vector representation of each feature for each feature-context pair by:
  initializing each feature to an N-dimensional vector; and
  generating a V×N-dimension matrix that stores the vector representation of each feature, wherein the unique vector representation of each feature is a vector of size V;

training the model using the vector representation of each feature to identify a contextual likelihood of each possible feature-context pair;

applying the trained model to a second collection of event logs to generate a classification score for each feature within each event log, the classification score representing a contextual likelihood of the feature appearing within the context included in that event log; and based on the classification score of a feature within a particular event log being outside a predetermined threshold:
  identifying the particular event log having the feature as containing an anomaly; and
  classifying the feature as being anomalous;

verifying each identified event log having the feature as containing an anomaly; and based on identifying a threat from applying the one or more rules, generating an alert.

* * * * *